Patented Jan. 14, 1936

2,028,109

UNITED STATES PATENT OFFICE 2,028,109

INSECTICIDAL SPRAY

Irwin Stone, New York, N. Y.

No Drawing. Application April 9, 1934,
Serial No. 719,748

6 Claims. (Cl. 167—13)

This invention relates to insecticidal sprays for plants and more particularly to toxic sprays whose residues have to be washed from the edible portion of the sprayed plant.

The struggle for existence between man and insects has been going on for many thousands of years and the insects having such an enormous headstart and being in some cases better fit to survive, have many times gained an upper hand. With the development of agriculture and the production of abundant crops per acre there has been a change of the balance of nature in favor of the propagation of insects due to the greater availability of food supply. To offset this trend there is placed on the plant various poisonous materials which will destroy the insects before they can damage the plants. These materials are generally sprayed onto the plant and the ideal spray should destroy the insects and afford lasting protection to the plant without materially affecting the plant itself or being poisonous to man and incidentally the spray should be cheap so that its use is economically possible.

It has been found that insects build up a resistance, which is hereditary, to these poisonous sprays making it necessary to use heavier spray schedules as time goes on, although even the light spray residues are dangerous to man. The use of these heavy spray schedules to effectively combat these insects has brought on the problem of toxicity to man due to spray residues left on the plants. So serious has this become that about 1925 the Government established limits for these spray residues on edible plant products. This may be shown by the following illustration: The use of lead arsenates as a spray for the control of the codling moth in the apple growing districts has long been practical and recommended by various Government agencies as a successful, effective method of control. In the early days by using a light spray schedule enough of the lead arsenate was washed off naturally by the rain before picking, leaving no dangerous amounts of the poison on the fruit as it went to the market. However, as time went on, it was found that heavier spray schedules were necessary in order to effectively control the insects.

With the use of heavier spray schedules more poisonous matter was left on the plant when it was marketed. About 1925 the Government taking cognizance of the possible dangers to commerce and health stepped into the picture and established tolerances for the amount of arsenic that may be left on the fruit for marketing. When this tolerance was announced the growers were at a loss as to what to do. They tried mechanical wipers for polishing the fruit but it was found that this method removed very little, if any, of the poisonous spray residue. Various means of chemical washing were tried then. Alkaline washes were used with success for removing the arsenic and it was assumed that if the arsenic was removed the lead also dissolved off. It was later shown that this was not the case—the alkali removed the arsenic but left the lead behind. It was then that the Government established the lead tolerance. The trend was then toward acid washes for removing the spray residue and dilute hydrochloric acid was recommended. The hydrochloric acid treatment is now in general use and is the accepted good practice. Lead arsenate, however, is not readily soluble in this dilute acid and requires long immersion to completely dissolve. It has also been found that a large percentage of the spray residue on fruits are concentrated at the skin and calyx ends. This thick heavy deposit tends to resist the solvent action of the acid due to its compact mass and also to the fact that insoluble lead chloride is formed which protects the rest of the mass from the solvent action of the acid.

I have found that by incorporating a material in the spray mixture such that when this material, in the residue, on the fruit, comes in contact with the acid wash solution it forms a gas which mechanically dislodges the particles of lead arsenate and carries them from the surface of the fruit and permits them to drop off. By this action it permits the acid to clean the fruit more quickly as it works not only by dissolving the lead arsenate but also by mechanical removal. Since the gas is formed on the inside of the residue film it tends to push off or dislodge the residue in an explosive manner. This is especially noticeable in the heavy deposits on the stem and calyx ends.

An important requirement of the gas forming material is that it should not react with the arsenate to form any soluble compound which may burn or attack the plant.

I have found that by mixing 3 pounds of zinc carbonate with the 3 pounds lead arsenate to 100 gallons of water I get a spray residue which is easily removed by dilute acid. When an apple heavily sprayed with the above mixture is immersed in the dilute hydrochloric acid wash solution, bubbles are seen to form on its surface and the residue is seen to flake off and fall away. I have also found that the local high concentrations of zinc chloride formed, from the reaction of the zinc carbonate and hydrochloric acid, also tends to make the lead arsenate more soluble in the acid. Spreaders, oils and other materials may be added to the above mixture to obtain various effects on the plant without affecting its special property of easy removal by bubble formation and mechanical disintegration.

The above mixture is given only as an illustrative example and I do not limit the scope of this patent to the proportions or kind of materials. Other insoluble carbonates may be used such as lead or iron carbonate and other arsenicals may be used such as ferrous arsenite and manganese arsenate. The only requirement of the mixture being that the insoluble carbonate should not react with the insoluble arsenic compound to form soluble arsenical compounds which would injure the plant.

By means of this invention it is possible to use a heavier spray for more effective control than would ordinarily be possible for easy removal and also to spray at a later date in the season.

Although I have described in considerable detail a specific example of composition and processes according to my invention, it will be understood that this is illustrative only and for the purpose of making the invention more clear and the invention is not to be regarded as limited in any way either by the foregoing particular description of the theories which I entertain and to which I attribute the benefits of the process or by the specific example given except in so far as such limitations are included within the terms of the accompanying claims, in which it is my intention to claim novelty inherent in my invention as broadly as is permissible in view of the prior art.

Having thus described my invention, what I claim as new and desire to secure by Letters Patent, is:

1. The process of facilitating the removal of spray residues which consists in incorporating in the spray compound an aqueous-insoluble material which is inert toward said compound, but which reacts with acid wash solutions to form a gas which mechanically dislodges the residue film.

2. The process of facilitating the removal of arsenical insecticidal spray residues which consists in incorporating in the spray compound an aqueous-insoluble material which is inert toward said compound, but which reacts with acid wash solutions to form a gas which mechanically dislodges the residue film.

3. The combination with an aqueous-insoluble insecticidal spray compound, of an aqueous insoluble material which is inert toward said compound, but which will react with acid wash solutions which are used to remove the residue of such sprays from agricultural produce, to form a gas to facilitate the removal of such residue.

4. The combination with an aqueous-insoluble arsenical insecticidal spray compound, of an aqueous insoluble material which is inert toward said compound, but which will react with acid wash solutions which are used to remove the residue of such sprays, to form a gas to facilitate the removal of such residue.

5. The combination with an aqueous-insoluble arsenical insecticidal spray composition, of a quantity of zinc carbonate to disintegrate the spray residue when the sprayed article is immersed in acid wash solutions.

6. The combination with an aqueous insoluble arsenical insecticidal spray composition, of a quantity of a carbonate inert towards said arsenical compound and used to disintegrate the spray residue when the sprayed article is immersed in acid wash solutions.

IRWIN STONE.